United States Patent [19]

Bowen et al.

[11] Patent Number: 4,663,506
[45] Date of Patent: May 5, 1987

[54] MICROWAVE CAKE AND BREAD MAKER

[75] Inventors: Robert F. Bowen, Burlington; Michael C. Heath, Lowell; Thomas J. Martel, North Reading, all of Mass.

[73] Assignee: Raytheon Company, Lexington, Mass.

[21] Appl. No.: 890,580

[22] Filed: Jul. 30, 1986

[51] Int. Cl.⁴ .............................................. H05B 6/64
[52] U.S. Cl. ........................ 219/10.55 E; 219/10.55 F; 99/DIG. 14; 126/390; 426/243
[58] Field of Search ................. 219/10.55 E, 10.55 F; 99/DIG. 14, 451; 426/243, 241, 234; 126/390

[56] References Cited

U.S. PATENT DOCUMENTS

| | | | |
|---|---|---|---|
| 3,783,220 | 1/1974 | Tanizaki | 219/10.55 E |
| 4,398,077 | 8/1983 | Freedman et al. | 219/10.55 E |
| 4,454,403 | 6/1984 | Teich et al. | 219/10.55 E |
| 4,478,349 | 10/1984 | Haverland, Jr. et al. | 219/10.55 E X |
| 4,486,640 | 12/1984 | Bowen et al. | 219/10.55 E |
| 4,501,946 | 2/1985 | Nibbe et al. | 219/10.55 E |
| 4,560,850 | 12/1985 | Levendusky et al. | 219/10.55 E |

Primary Examiner—Philip H. Leung
Attorney, Agent, or Firm—William R. Clark; Richard M. Sharkansky

[57] ABSTRACT

A covered microwave cooking vessel or cake/bread baker for browning a food body. A microwave absorbing material, comprising separated layers of ferrite, absorbs microwave energy to provide heat for heating the food body by conduction, thermal radiation and convection. The cover and bottom of the cooking vessel may also be used as individual browning utensils.

21 Claims, 9 Drawing Figures

MICROWAVE CAKE AND BREAD MAKER

BACKGROUND OF THE INVENTION

This invention relates generally to cooking utensils for use in microwave ovens. It is well known that foods cooked by exposure to microwave energy cannot obtain the brown surfaces or outer crust which are obtainable with conventional thermal cooking. Another limitation of microwave cooking is that foods made from cereal grains such as, for example, cakes and bread products become soggy and/or leathery. These foods will also not attain the relatively uniform texture which is attainable when they are cooked in a conventional thermal oven.

A number of approaches have been utilized to brown foods in a microwave oven by the use of cooking utensils having microwave absorbing materials such as ferrites embedded within a portion of the utensil, or having a layer of ferrites attached to a portion of the utensil. In a conventional manner, the ferrites absorb microwave energy thereby conducting heat through those utensil surfaces upon which the ferrites are attached and into the food extremities in contact with those utensil surfaces. A disadvantage of these approaches is that they only brown food surfaces which are in contact with, or in close proximity to, the ferrite heated cooking utensil surfaces. These approaches therefore cannot brown the top of food surfaces which rise during the baking process such as cakes or breads. For example, U.S. Pat. No. 4,190,757 discloses a disposable pan having a bottom, shallow sides and cover. Microwave absorbing material is shown covering substantially the entire pan perimeter. The pan is designed to encapsulate a prepared food wherein the food top surface touches, or is in close proximity to, the heated pan cover. In another approach, U.S. Pat. No. 4,486,640 discloses a utensil suitable for cooking relatively flat breads such as, for example, corn bread. A utensil substantially shielded from microwave energy includes a removable top, ferrite embedded bottom and metal sidewalls. The ferrite conducts heat into the bottom and up the relatively short sidewalls. Accordingly, the bottom and sides, but not the top, of the bread are browned by heat conducted thereto.

Another problem with the above approaches is that they will not adequately brown a wide variety of cakes and breads requiring relatively deep sidewalls. The thermal mass of the sidewalls is too large to be uniformly heated by conduction from the bottom layer. Increasing the amount of ferrite embedded in the utensil bottom is not a viable solution since the food bottom would then become scorched. Extending the layer of ferrites up the sidewalls is not a viable solution either. If the deep sidewalls, having a relatively large surface area, are coated with ferrite the food body would be over baked.

SUMMARY OF THE INVENTION

The invention defines a microwave cooking utensil for cooking a food body and browning the surfaces of the food body to a substantially uniform texture, comprising a microwave reflective container having a bottom and raised side, and means for heating the surface areas of the container bottom and container side to a substantially uniform temperature, the heating means comprising a first microwave absorber coupled to the container bottom for absorbing microwave energy to conduct heat through the container bottom and into the container side, and a second microwave absorber coupled to the container side and spatially separated from the first absorber for absorbing microwave energy to conduct heat into the container side. The first absorber and second absorber are positioned to provide a substantially uniform temperature, between 300° F. and 400° F. across the container bottom and side thereby uniformly browning the bottom and sides of a food body.

The invention may further be defined by a microwave cooking utenisl for browning the top of a food body which rises within the utensil during the cooking process, comprising a container having a bottom and raised side, a microwave reflective cover having a top and downward extending side, means for mating the container side to the cover side, the cover side elevating the cover top beyond the maximum height to which the food body rises when the cover side is mated to the container side, and a microwave absorbing material bonded to the cover top for absorbing microwave energy to conduct heat to the inside of the cover top for thermally heating the food body top by both thermal radiation and by heating the air between the cover top and the food body top. Accordingly, the utensil browns the top of a food body which rises during the baking process without having the food body impinge against the cover.

The invention may also be defined by a utensil for cooking food in a microwave oven, comprising a microwave transparent lower casing, a metallic container having a bottom, a raised side and an open top, means for attaching the container within the lower casing, a first layer of microwave absorbing material bonded to a portion of the outside of the container bottom, the first layer absorbing microwave energy to provide heat for conducting through the container bottom and into the container side, a second layer of microwave absorbing material bonded to a portion of the outside of the container side, the secohd layer absorbing microwave energy to provide heat for conducting into the container side, the second layer being spaced from the first layer for providing a substantially uniform temperature along the container side, a microwave transparent upper casing, a metallic cover having a top and a downwardly extending side, means for attaching the cover within the upper casing, means for detachably mating the upper casing to the lower casing, and a third layer of microwave absorbing material bonded to the outside of the cover top, the third layer absorbing microwave energy to provide heat for conducting to the inside of the cover top for heating the air space between the cover top and the open container top and for emitting thermal radiation through the air space. Accordingly, the utensil browns the entire surface, including the top, of a food body contained therein.

BRIEF DESCRIPTION OF THE DRAWING

For a more complete understanding of the invention, reference is now made to the following description taken together in conjunction with the accompanying drawings, in which.

DESCRIPTION OF THE PREFERRED EMBODIMENT

Figure 1:
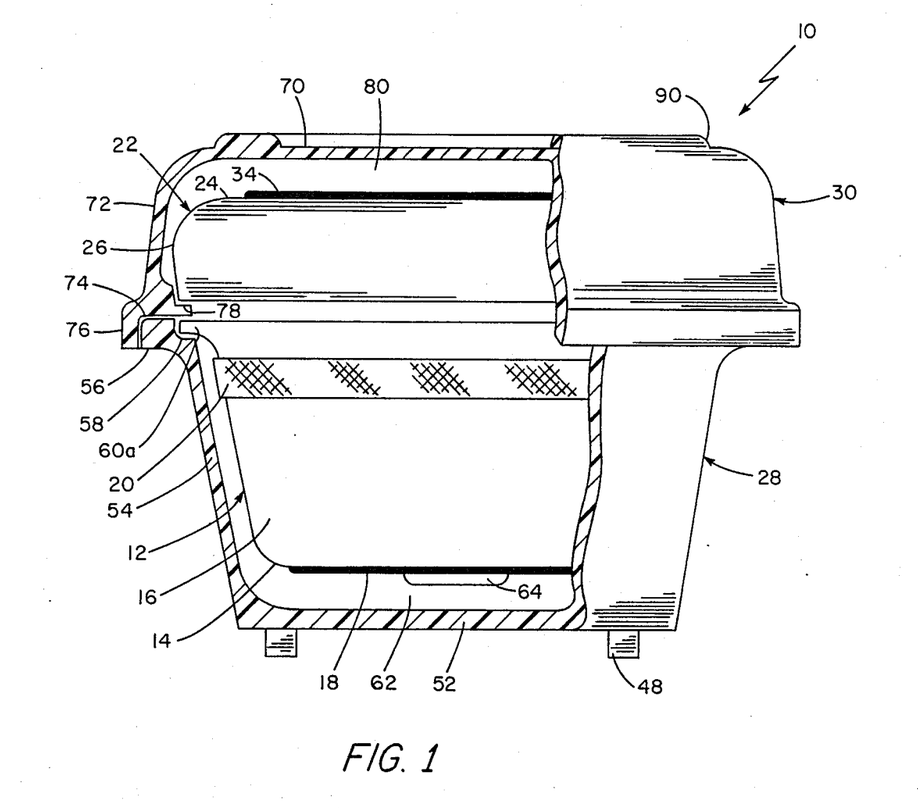
FIG. 1 is a partially broken away perspective view of a cooking utensil.
Figure 2:
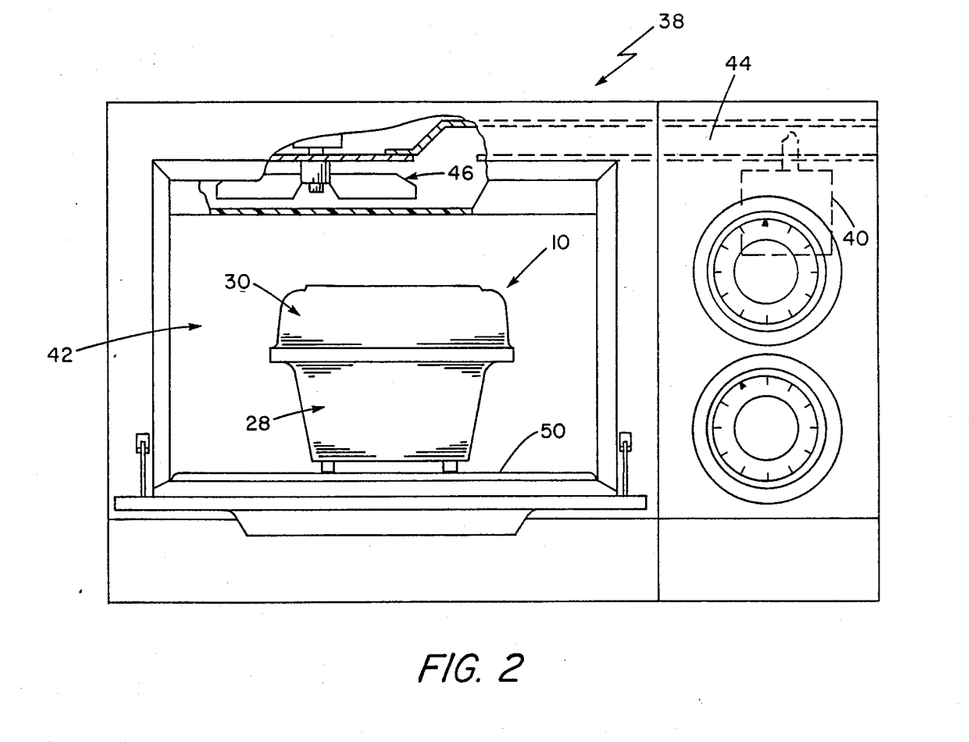
FIG. 2 shows the cooking utensil positioned in a conventional microwave oven.

Referring to FIGS. 1 and 2, and more particularly to FIG. 1, a perspective view of microwave cooking utensil or cake/bread baker 10 is shown partially broken away to illustrate the component parts. Cooking utensil 10 broadly includes a microwave shielded container 12, preferably constructed from a microwave reflective and conductive material such as aluminum, having bottom 14 and raised side 16. As described in more detail hereinafter, means are coupled to container 12 for heating the surface areas of container bottom 14 and container side 16 to a substantially uniform temperature. The heating means comprises a first microwave absorber, here shown comprising a first layer of ferrite 18 bonded to a portion of the outside of container bottom 14, for absorbing microwave energy to conduct heat through container bottom 14 and into container side 16. The heating means also comprises a second microwave absorber, here shown comprising a second layer of ferrite 20 bonded to a portion of the outside container side 16 and spaced from first layer 18, for absorbing microwave energy to conduct heat into container side 16. First layer 18 and second layer 20 are positioned to provide a substantially uniform temperature across bottom 14 and container side 16. Cooking utensil 10 is also shown including a cover 22, preferably constructed from a microwave reflective and conductive material such as aluminum, having a top 24 and downwardly extending side 26. Container 12 and cover 22 are here shown respectively positioned within microwave transparent lower casing 28 and microwave transparent upper casing 30. For reasons to be described hereinafter, lower casing 28 and upper casing 30 provide means for detachably mating cover 22 to container 12. When cover 22 and container 12 are mated, the height of cover side 26 defines an air space 32 (FIG. 3) above container 12. The heating of air space 32, and thermal radiation through air space 32, provides top browning of the food body being baked in cooking utensil 10. More particularly, a third microwave absorber, here shown comprising a third layer of ferrite 34, is bonded to the outside of cover top 24. Third layer of ferrite 34 absorbs microwave energy to provide heat for conducting into the inside surface 36 (FIG. 3) of cover top 24 for heating air space 32 and emitting thermal radiation from inside surface 36 into container 12. Thus, cooking utensil 10 provides uniform browning of the entire perimeter of a food body being baked therein, including the top of the food body. Further, the combination of thermal air heating and thermal radiation provides top browning for food bodies such as cakes or breads which vary in height during the baking process, and also vary by product brand and/or the manner in which the consumer prepares the product.

In the preferred embodiment, the ferrite layers provide thermostatic heating to utensil 10. More specifically, because the ferrite layers are adjacent to a metal surface where the electric field component of the microwave energy is null, substantially all of the coupling is to the magnetic field component and that is significantly reduced at the Currie temperature of the ferrite. Those skilled in the art will recognize that other magnetic permeable materials may be used besides ferrite such as, for example, magnetite or iron.

Referring to FIG. 2, cooking vessel 10 is shown positioned for use in a microwave oven 38. Typically, microwave energy having a frequency of 2450 MHz is provided by magnetron 40 and coupled to cavity 42 of oven 38 via suitable means such as, for example, through waveguide 44 and past mode stirrer 46. Cooking utensil 10 is shown having lower casing 28 and legs 48 attached thereto to elevate container bottom 14 (FIG. 1) sufficiently above microwave oven floor 50 to enable microwave energy to couple to first layer of ferrite 18.

Figure 3:
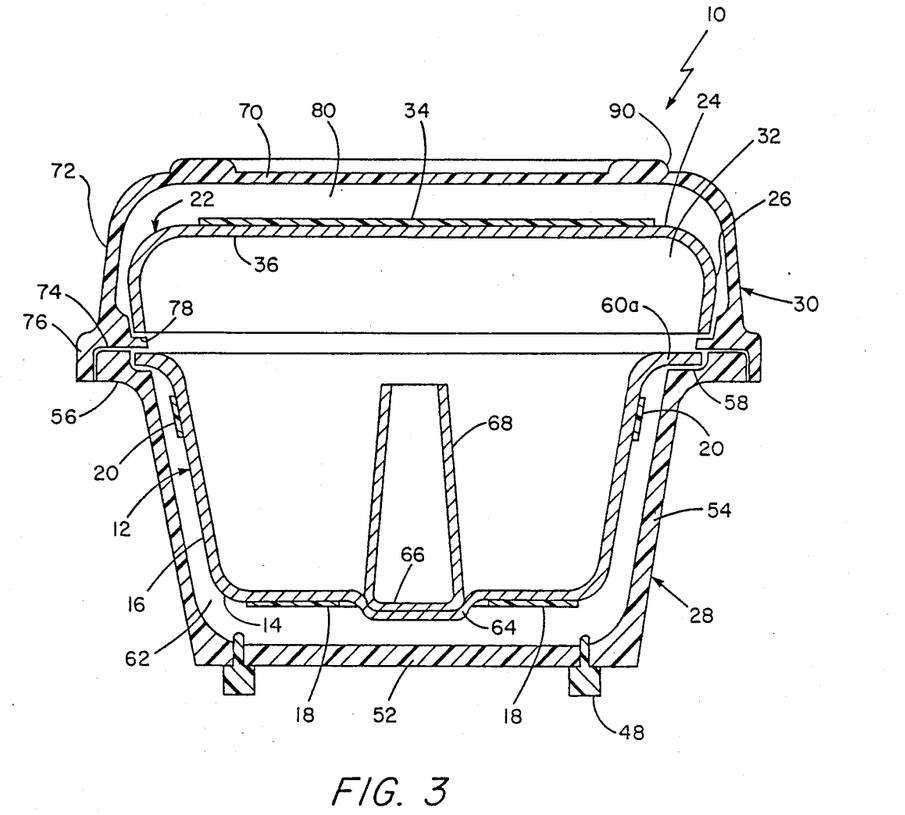
FIG. 3 is a cross-sectional view of the cooking utensil.

A more detailed description of cooking utensil 10 is now given with particular reference to FIG. 3. Lower casing 28, preferably constructed from a substantially microwave transparent material which is able to withstand temperatures of up to 500° F. without distortion, such as thermal set polyester, is shown having bottom 52, raised side 54 and rim 56 with ledge 58 positioned therein. Legs 48, or other suitable elevating structures, are shown attached to bottom 52. Container 12, preferably a 100 gram aluminum container with three quart capacity, is shown having bottom 14, raised side 16 and flange 60 outwardly protruding from container side 16. Flange 60 is adapted for attachment to ledge 58 thereby suspending container 12 within lower casing 28. A thermal resistant adhesive (not shown) such as silicone may be utilized to attach flange 60 to ledge 58. By suspending container 16 within lower casing 54, a cavity 62 is formed therebetween for providing thermal insulation to container 12. Indentation 64 is here shown concentrically positioned within container bottom 14 for detachably receiving the bottom 66 of cone 68 whereby cooking utensil 10 is adapted to be a tube or bundt cake baker.

Figure 4:
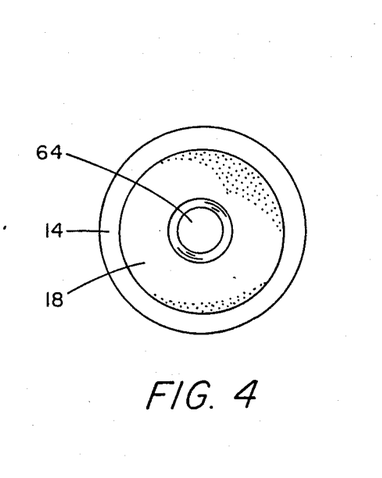
FIG. 4 is a bottom view of the container of the cooking utensil shown on a reduced scale.

Container bottom 14 is here shown having a first layer of ferrite particulate 18 bonded thereon (see also FIG. 4). Preferably, the first layer may be of flexible plastic layer having ferrite particles dispersed therein. The plastic layer may comprise a high temperature silicone having a thickness of approximately 0.05 inches and a diameter of approximately seven and one-half inches concentrically positioned around indentation 64 which has a diameter of approximately two inches. Also, the ferrite particles may be ferrite Q1 supplied by Indiana General; 100 grams of ferrite may preferably be contained in layer 18. A second layer of ferrite 20 is here shown as a continuous strip bonded to container side 16. Preferably, second layer 20 may comprise a $\frac{1}{2}$–$1\frac{1}{2}$ inch wide bonded strip of ferrite which is positioned within 2 inches of the top of container side 16 wherein container side 16 has a depth of approximately 3-5 inches. Second layer 20 may prefereably contain 45 grams of ferrite.

The dimensions, ferrite content and placement of first layer 18 and second layer 20 have been determined by empirical testing to achieve a substantially uniform browning across the sides and bottom of a food body. Preferably, first layer 18 may also be designed to brown the bottom of a cake to a greater depth than the sides for maintaining the integrity of the cake when container 12 is inverted and the cake discharged therefrom. Second layer 20 has been designed to heat container side 16, in combination with the heat conducted thereto from container bottom 14, in order to achieve a temperature distribution within a predetermined range along container side 16. Preferably, the temperature along the inside surface of container side 16 should range between 300° F. and 400° F.

Figure 6:
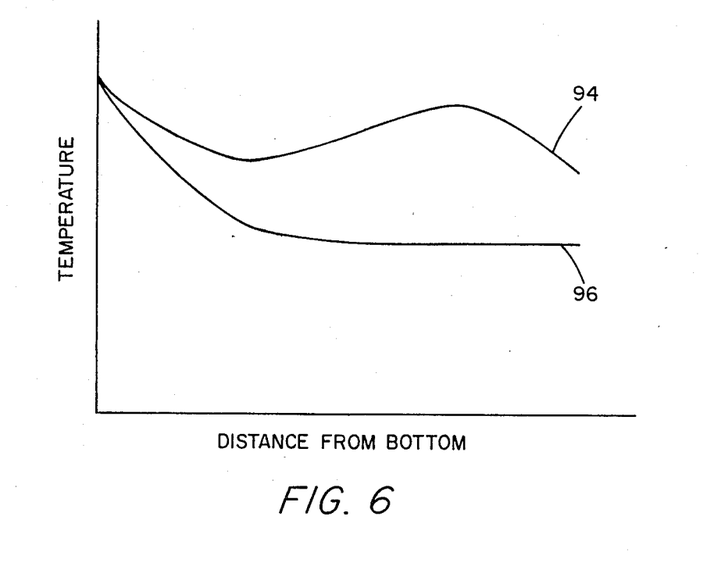
FIG. 6 shows respective plots of temperature versus distance along the container side for a container side with a layer of ferrite and for a container side without a layer of ferrite.

Referring now to FIG. 6, the advantages of second layer 20 are discussed. FIG. 6 is a graph of temperatures measured along the height of the inside surface of container side 16 after an uncovered and empty container 12 has been heated in a 700 watt microwave oven for five minutes. For comparative purposes, two temperature versus distance graph lines are shown. Graph line 94 shows temperature versus distance along container side 16 with second layer 20 embedded thereon; graph line 96 shows temperature versus distance along a container side 16 without a second layer 20 embedded thereon. Referring first to graph line 96, it is seen that heatinq container side 16 only by heat conduction from container bottom 14 results in a sharp fall in temperature with distance from container bottom 14. It is readily apparent that uniform browning cannot be achieved by this configuration. In fact, at a temperature of approximately 250° F. across most of container side 16, browning of the adjacent food surfaces may not be achieved at all. If the ferrite content of first layer 18 were increased to maintain a temperature sufficient for browning, container bottom 14 and the portion of container side 16 adjacent thereto would become sufficiently hot to scorch the food product. In accordance with the preferred embodiment, a second layer 20 having dimensions and placement relative to the dimensions of container 12 and first layer 18 as described hereinabove is provided to achieve a temperature distribution within the desired range as illustrated by graph line 94.

Figure 8:
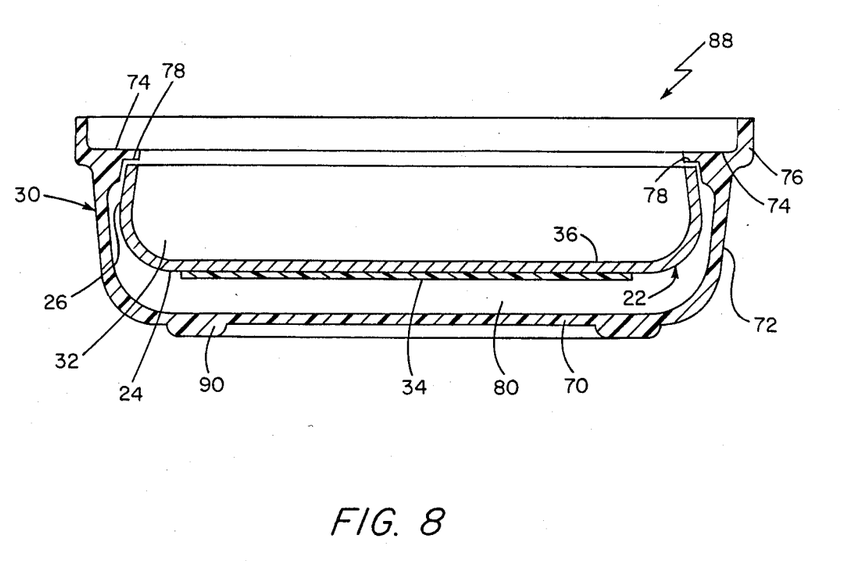
FIG. 8 shows the use of the cooking utensil cover as a microwave browning or frying utensil.

Referring back to FIGS. 1 and 3, upper casing 30, preferably constructed from a substantially microwave transparent material which is able to withstand temperatures of up to 500° F. such as thermoset polyester, is shown having top 70 and downward extending side 72. Ledge 74 and downward extending lip 76 of casing side 72 are adapted for detachably mating upper casing 30 with lower casing 28. Shelf 78 on the interior of casing side 72 is adapted for receiving cover side 26 whereby upper casing 30 encases cover top 24 and cover side 26. Preferably, a thermal resistant adhesive (not shown) such as silicone may be used to bond cover side 26 to shelf 78 and casing side 72. Cavity 80, defined by the spacing between upper casing 30 and cover 22, provides thermal insulation to cover 22. As will be discussed in more detail hereinafter, upper casing 30 is shown having protruding member or ridge 90 for supporting upper casing 30 in an inverted position (FIG. 8).

Figure 5:
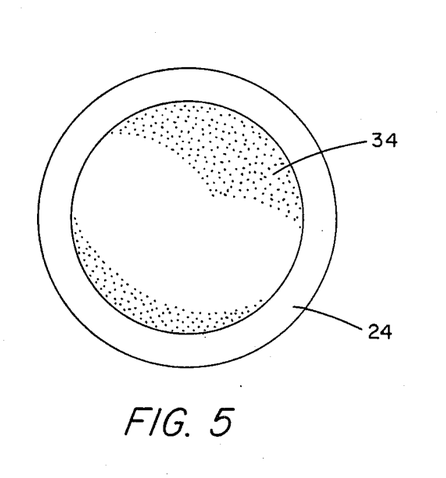
FIG. 5 is a top view of the cover of the cooking utensil shown on a reduced scale.

Cover 22, preferably a 226 gram aluminum cover with a 10 inch diameter is here shown having a third layer of ferrite particulate 34 bonded onto the outer surface of cover top 24 (see also FIG. 5). Preferably, third layer 20 may comprise a nine inch diameter layer containing approximately 220 grams of ferrite. The inside surface 36 of cover top 24 is preferably coated with a black material for providing thermal radiation into container 12 as cover top 24 is heated by microwave absorption from third layer 34. The coating material may be a synthetic resin polymer which would also provide a non-sticking surface.

Figure 7:
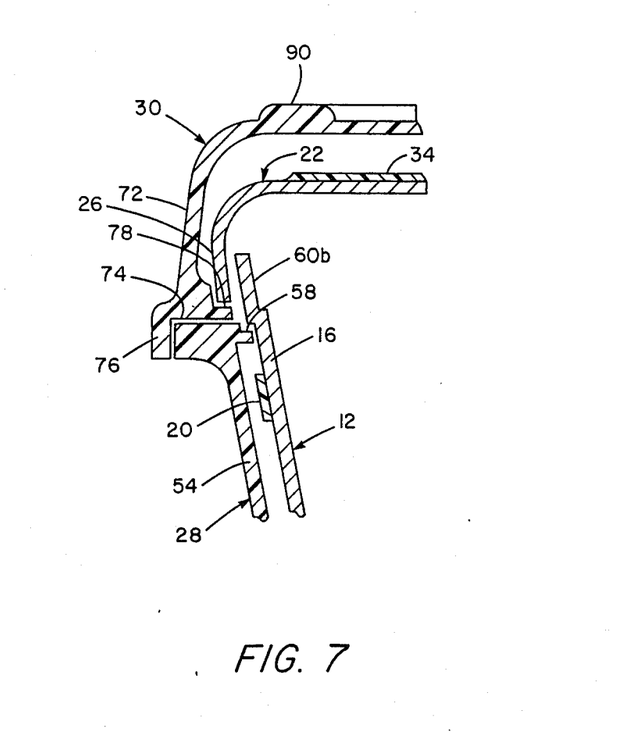
FIG. 7 is an expanded cross-sectional view of a portion of the cooking vessel showing an alternate embodiment having a microwave choke between the container and the cover.

When upper casing 30 is mated to lower casing 28, cover 22 is held in fixed relationship to container 12. Preferably, cover 22 may be slightly elevated above container 12 to define gap 82 for allowing some microwave energy to enter vessel 10. A criteria for dimensioning gap 82 is to permit enough microwave energy to enter for accelerating the cooking process without causing the cake or bread product to become leathery or soggy. Further, gap 82 should be sufficiently large to prevent electrical arcing between cover 82 and container 12. Our testing indicates that a gap of between one-quarter inch and one inch will achieve the above criteria. At this spacing, approximately 5-20% of the food cooking is accomplished by microwave radiation and 80-95% by thermal cooking. In an alternate embodiment, shown in FIG. 7, a configuration is illustrated which prevents substantially all the microwave energy from entering the interior of cooking utensil 10. More specifically, flange 60b of container side 16 is here shown extending upwardly and substantially parallel in a vertical direction to cover side 26 to form a partial microwave choke. In theory, for optimum microwave sealing, it may be preferable that the vertical parallel distance of flange 60b and cover side 26 be an odd multiple of a quarter wavelength of the microwave energy. In practice, it has been found that a distance of an inch or greater is more than adequate and a distance of five-eighths of an inch is sufficient.

Referring back to FIG. 3, when upper casing 30 is mated to lower casing 28, air space 32 is defined by the spacing between cover top 24 and container 12. Air space 32 is designed to accommodate a food product which rises during the baking process. Typically, the baked food product expands to a final volume which is approximately one third greater than its initial volume. Further, cakes and breads will overshoot, or rise beyond their final volume, during the baking process due to the expanded hot air and water vapor entrapped within the cake. After cool down, the entrapped hot air and water vapor escapes resulting in food product contraction to its final volume. The overshoot and final volume are dependent upon the ingredients of a particular food product mix and operator discretion in mixing the ingredients. It has been empirically determined, after testing large numbers of commercially available cake mixes, that the overshoot above container 12 will not exceed one and one-half inches. Cover side 26, cover 22 and third layer of ferrite 34 are therefore designed to accommodate the cake overshoot and also to brown the cake top to a uniform texture consistant with the rest of the cake surfaces which are browned by container 12. With cover side 26 having a height between 1½ and 2½ inches, and cover 22 being thermally heated by third layer of ferrite 34 as previously described, air space 32 is heated to a range of 300° F. to 400° F. This is approximately the same temperature range that container side 16 and container bottom 14 achieve. Thus, the cake or other food product will be uniformly browned on all surfaces and the cake will not impinge against cover top 24.

Those skilled in the art will also recognize that by increasing the height of cover side 26 and increasing the ferrite content of layer 34, uniform browning may also be obtained. However, utensil 10 may then have an overall height which is not suitable for use in a microwave oven. Further, as described in greater detail hereinafter, the combination of upper casing 30 and cover 22 are suitable for use as a microwave browning or frying utensil 88 (FIG. 8) when placed in an inverted position. In that use, cover 22 should not be heated more than 400° F. to prevent scorching the food in contact with inside surface 36 of cover 22. Accordingly, it is preferable that that surface 36 be elevated less than 2½ inches from the top of container 12. Otherwise, air space 32 will not be sufficiently heated to adequately brown the top of a food product.

Figure 9:
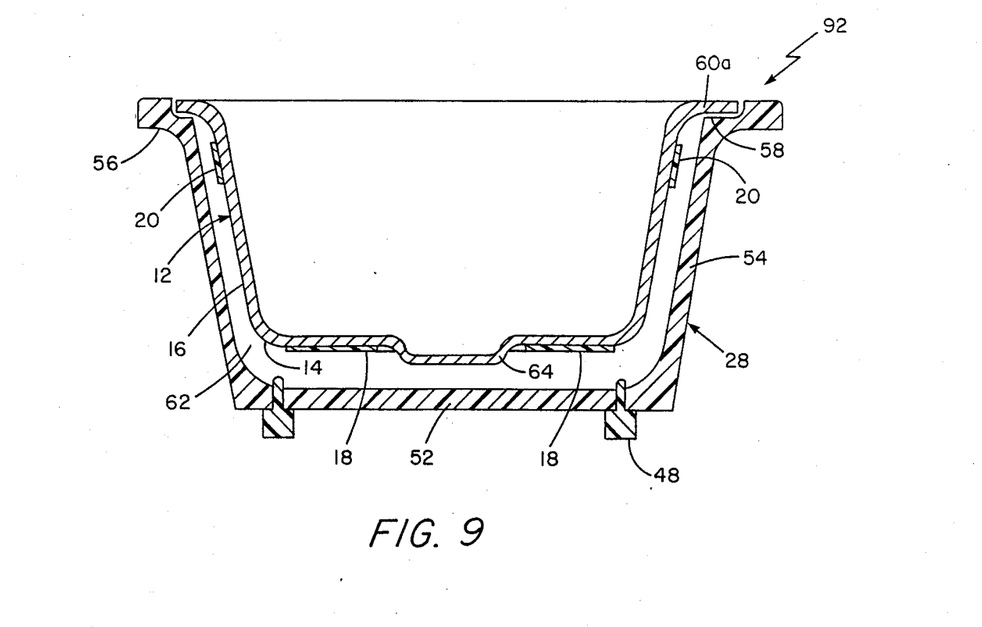
FIG. 9 shows the use of the cooking utensil without a cover as a microwave browning pan.

An alternate embodiment is illustrated in FIG. 8 wherein the combination of cover 22 and upper casing 30 defines microwave browning or frying utensil 88. When placed in the inverted position on the microwave oven floor 50 (FIG. 2), circumferential ridge 90, or an other suitable elevating structure connected to casing 30, and cavity 80 elevate third layer of ferrite 34 above floor 50 to enable microwave energy to impinge thereon. Microwave energy is thereby converted into thermal heat which is conducted to inside surface 36 for heating and browning a food body (not shown) in contact with inside surface 36. In addition, microwave energy directly impinges upon the food body to accelerate the cooking process. Another embodiment is illustrated in FIG. 9 wherein the combination of container 12 and lower casing 28 defines microwave browning pan 92. As described previously herein, first layer of ferrite 18 and second layer of ferrite 20 convert microwave energy to thermal heat for browning and heating a food body within container 12. Microwave energy will also directly impinge upon the food body to accelerate the cooking process.

The reading of this Description of the Preferred Embodiment will bring to mind many alterations and modifications without departing from the spirit and scope of the invention. For example, cooking utensil 10 may be used for many foods other than cakes and breads. Also, with minor modifications, cooking utensil 10 and the layers of microwave absorbing materials may be modified in sizes, weights, materials and configurations other than the ones illustrated. Accordingly, it is intended that the scope of the invention be limited only by the appended claims.

What is claimed is:

1. A utensil for cooking food in a microwave oven, comprising:
    a microwave transparent lower casing;
    a metallic container having a bottom, an upwardly extending side and an open top;
    means for supporting said container within said lower casing;
    a first layer of microwave absorbing material bonded to a portion of the outside of said container bottom, said first layer absorbing microwave energy to provide heat for conducting through said container bottom and into said container side;
    a second layer of microwave absorbing material bonded to a portion of the outside of said container side, said second layer absorbing microwave energy to provide heat for conducting into said container side, said second layer being spaced from said first layer for providing a substantially uniform temperature along said container side;
    a microwave transparent upper casing;
    a metallic cover having a top and a downwardly extending side;
    means for attaching said cover within said upper casing;
    means for detachably mating said upper casing to said lower casing; and
    a third layer of microwave absorbing material bonded to the outside of said cover top, said third layer absorbing microwave energy to provide heat for conducting to the inside of said cover top for heating the air space between said over top and said open container top and for emitting thermal radiation through said air space.

2. The utensil recited in claim 1 wherein said container bottom and a portion of said container side are spatially separated from said lower casing for providing thermal insulation to said container.

3. The utensil recited in claim 1 wherein said cover top and a portion of said cover side are spatially separated from said upper casing for providing thermal insulation to said cover.

4. The utensil recited in claim 1 wherein the height of said cover side is between 1½ inches and 2½ inches.

5. The utensil recited in claim 1 further comprising:
    a cone; and
    means for removably attaching said cone to said container bottom.

6. The utensil recited in claim 1, further comprising a plurality of legs outwardly protruding from the bottom of said lower casing.

7. The utensil recited in claim 1, wherein said microwave absorbing material comprises ferrite.

8. The utensil recited in claim 1 wherein said upper casing includes means for holding said upper casing and said metallic cover in a stable inverted position on the floor of a microwave oven.

9. The utensil recited in claim 1 wherein said cover side overlaps said container side defining a gap between parallel spaced surfaces.

10. The utensil recited in claim 1 wherein said container and said cover top are comprised of aluminum.

11. The utensil recited in claim 1 wherein said first, said second and said third layers of ferrite are respectively bonded to said container bottom, said container side and said cover top with high temperature silicone.

12. A utensil for cooking food in a microwave oven, comprising:
    a microwave transparent lower casing having a bottom and a side wall with ledge;
    a metallic container having an open top, a bottom and a side wall with an outwardly protruding flange for seating on said lower casing ledge;
    a first layer comprising ferrite particulate bonded to a portion of the underside of said container bottom, said first layer absorbing microwave energy to provide heat for conducting through said container bottom and into said container side;
    a second layer comprising a continuous strip of ferrite particulate bonded to a portion of the outside of said container side wall, said second layer absorbing microwave energy to provide heat for conducting into said container side wall, said second layer being spatially separated from said first layer for providing a substantially uniform temperature along said container side wall;

a microwave transparent upper casing having a top and a downwardly extending side wall with a shelf, said upper casing side wall having a contoured edge for detachably mating with said lower casing side wall;

a metallic cover having a top and a downwardly extending side wall, said cover side wall seating on said shelf of said upper casing, the height of said cover side wall defining an air space between said cover top and said open container top when said upper casing is mated with said lower casing; and a third layer comprising ferrite particular bonded to the outside of said cover top, said third layer absorbing microwave energy to provide heat for conducting to the inside of said cover top for heating said air space and emitting thermal radiation through said air space into said container.

13. The utensil recited in claim 12 wherein said container bottom and a portion of said container side wall are spatially separated from said lower casing for providing thermal insulation to said container.

14. The utensil recited in claim 12 wherein said cover top and a portion of said cover side wall are spatially separated from said upper casing for providing thermal insulation to said cover.

15. The utensil recited in claim 12 wherein the height of said cover side wall is between 1½ inches and 2½ inches.

16. The utensil recited in claim 12 further comprising:
a cone; and
means for removably attaching said cone to said container bottom.

17. The utensil recited in claim 12 further comprising a plurality of legs outwardly protruding from the bottom of said lower casing.

18. The utensil recited in claim 12 wherein said upper casing includes a substantially flat surface substantially parallel to and spaced from said metallic cover top for holding said metallic cover top in a stable inverted position on the floor of a microwave oven.

19. The utensil recited in claim 12 wherein said upper casing includes an outwardly protruding member for holding said upper casing and said metallic cover in a stable inverted position on the floor of a microwave oven.

20. The utensil recited in claim 12 wherein said container and said top are comprised of aluminum.

21. The utensil recited in claim 12 wherein said first, said second and said third layers of ferrite are respectively bonded to said container bottom, said container side and said cover top with high temperature silicone.

* * * * *